United States Patent
Blong et al.

(10) Patent No.: US 9,774,919 B2
(45) Date of Patent: Sep. 26, 2017

(54) AUTOMATED SUGGESTIONS AND CORRECTIONS OF CONTENT CLIPS

(71) Applicant: Verizon Patent and Licensing Inc., Arlington, VA (US)

(72) Inventors: Devin Blong, Penngrove, CA (US); Kevin Flores, San Jose, CA (US); Tushar Chaudhary, San Francisco, CA (US); Manish Sharma, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/960,332

(22) Filed: Dec. 4, 2015

(65) Prior Publication Data

US 2017/0164060 A1   Jun. 8, 2017

(51) Int. Cl.
| | |
|---|---|
| *H04N 21/41* | (2011.01) |
| *H04N 21/482* | (2011.01) |
| *H04N 21/61* | (2011.01) |
| *H04N 21/84* | (2011.01) |
| *H04N 21/845* | (2011.01) |
| *G11B 27/10* | (2006.01) |
| *H04N 21/442* | (2011.01) |
| *H04N 21/472* | (2011.01) |
| *H04N 21/44* | (2011.01) |
| *H04N 21/25* | (2011.01) |
| *H04N 21/466* | (2011.01) |
| *H04N 21/258* | (2011.01) |
| *H04N 21/45* | (2011.01) |

(52) U.S. Cl.
CPC ....... *H04N 21/4826* (2013.01); *G11B 27/10* (2013.01); *H04N 21/252* (2013.01); *H04N 21/25883* (2013.01); *H04N 21/44008* (2013.01); *H04N 21/44204* (2013.01); *H04N 21/4532* (2013.01); *H04N 21/4667* (2013.01); *H04N 21/47205* (2013.01); *H04N 21/6125* (2013.01); *H04N 21/84* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 2005/0082338 A1* | 4/2005 | He | C09J 11/04 228/101 |
| 2008/0282019 A1* | 11/2008 | Lincoln | H04H 60/39 711/3 |
| 2015/0082338 A1* | 3/2015 | Logan | A23L 2/52 725/32 |

* cited by examiner

*Primary Examiner* — Cai Chen (57) ABSTRACT

Techniques described herein may allow for the single-input capture of clips during the presentation of content, such as video content. The single-input capture may be based on an analysis of clips captured by users in the same video content, such that popular clips can be identified and used for subsequent users. A user may select a button to capture, or to begin capturing, a clip during the presentation of content. Based on the single selection of the button, an entire clip may be captured, which may correspond to a previously detected popular clip.

20 Claims, 9 Drawing Sheets

AUTOMATED SUGGESTIONS AND CORRECTIONS OF CONTENT CLIPS

BACKGROUND

Social media, file sharing services, and other mechanisms allow individuals to easily share content, such as video clips. For example, viewers of movies and/or other types of video content, when viewing a remarkable scene, and may wish to share the scene with friends and/or family. Typically, when viewing on a user device, such as a mobile telephone, a personal computer, or a tablet computer, a user may manually generate a clip of the portion of the content that he or she wishes to share, by selecting a start time and an end time of the clip.

DETAILED DESCRIPTION OF PREFERRED EMBODIMENTS

The following detailed description refers to the accompanying drawings. The same reference numbers in different drawings may identify the same or similar elements.

Figure 1:
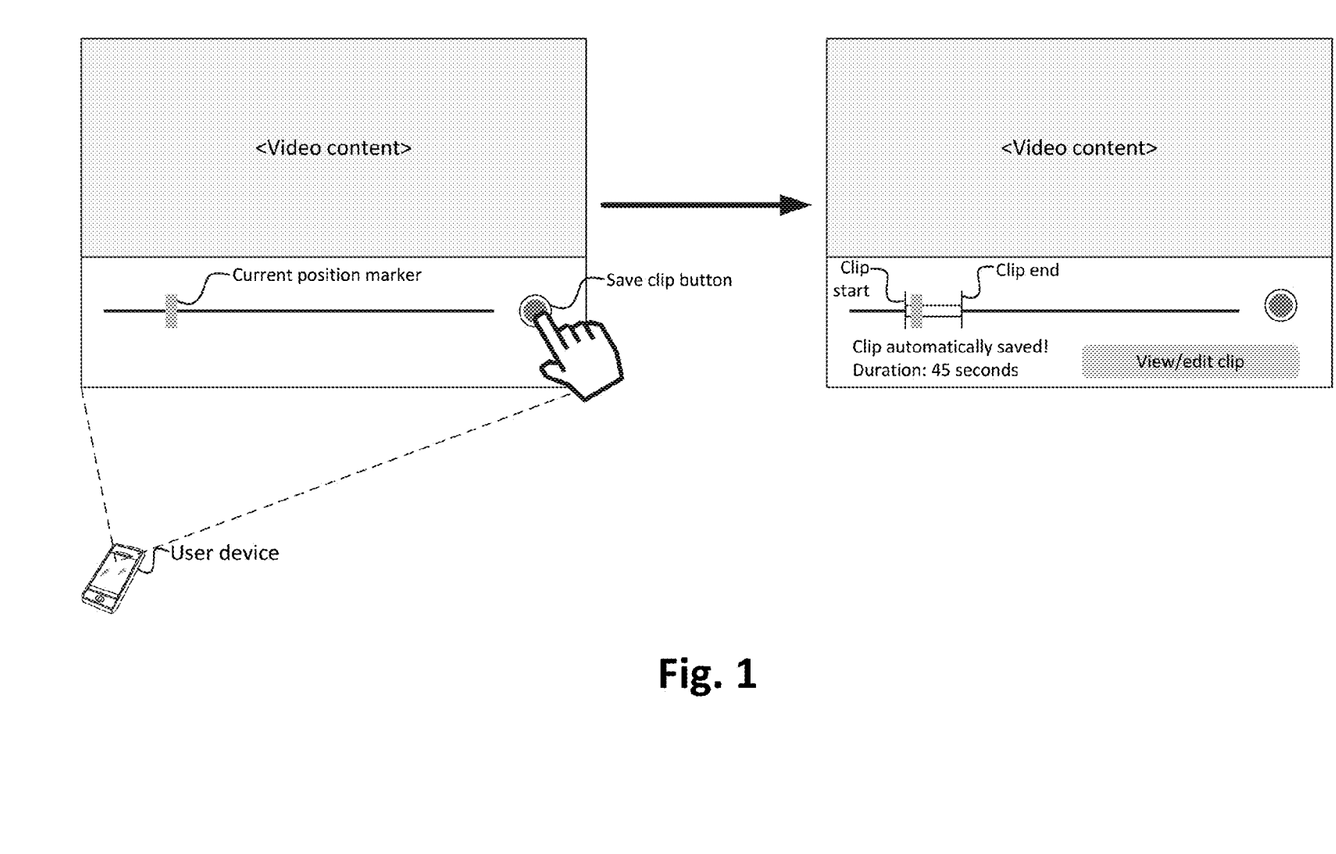
FIG. 1 illustrates an example overview of one or more implementations described herein, in which a user device may automatically capture a clip, during the presentation of video content, based on a single button press from a user.

Implementations described herein may allow users to automatically capture clips of currently playing content (e.g., video content) with a single input, such as a single button press. For example, as shown in FIG. 1, video content (represented in the figure as "<Video content>") may be playing at a user device. A control may be presented on a user interface ("UI") of the user device, which may allow a user to capture a portion of the presently playing content (i.e., a "clip"). In FIG. 1, this control is represented by the "Save clip" button.

As shown, assume that a user presses the "Save clip" button at a particular time point during the presentation of the video content (the particular time point being indicated by the current position marker). In accordance with some implementations, a full clip may be captured, based on the single selection of the "Save clip" button. In some implementations, the clip may be automatically determined based on other clips that were captured by other users. In this sense, popular clips may be automatically detected and suggested to users who initiate a clip capture.

For example, as shown, a start time of the clip ("Clip start") may be different from (e.g., earlier than) the time point at which the user selected the "Save clip" button, and the end time of the clip ("Clip end") may also be automatically determined. In the example shown in FIG. 1, the clip duration is 45 seconds. These 45 seconds may correspond to a scene which a relatively large quantity of users have previously saved as clips (either by manually selecting the start and/or end times, or by implicitly or explicitly indicating approval of automatically generated clips).

As further shown, a "View/edit clip" option may be presented, which the user may select to potentially modify the automatically generated clip. For example, the user may choose to modify the start time and/or the end time of the automatically generated clip. The modifications may be used, in accordance with some implementations, in refining the automatic generation of clips for subsequent users.

Figure 2:
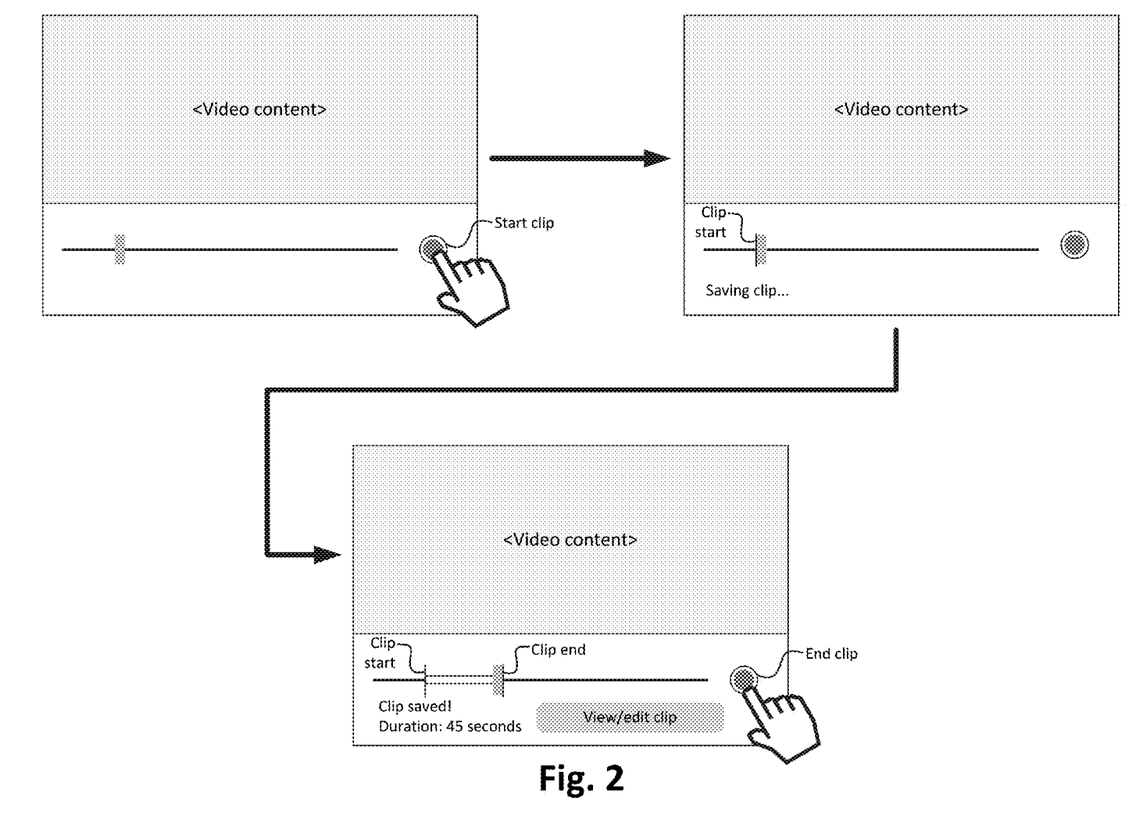
FIG. 2 illustrates a conventional technique, in which a user device may capture a clip based on manual inputs of start and end times for the clip.

The single-input clip generation, in accordance with implementations described herein, may be advantageous, as compared to conventional techniques, in which multiple inputs are required to generate a clip. FIG. 2 illustrates one such conventional technique. For example, as shown, a user may select a "Start clip" button, at which time a clip may begin to be captured. After some time, the user may select an "End clip" button, at which time the clip is completed. In these scenarios, the user has to make a minimum of two selections (i.e., start clip and end clip), and potentially more (in the case where the user did not realize until the clip had already started that he or she would like to save the clip, and/or the case where the user accidentally ended the clip too early or too late).

Figure 3:
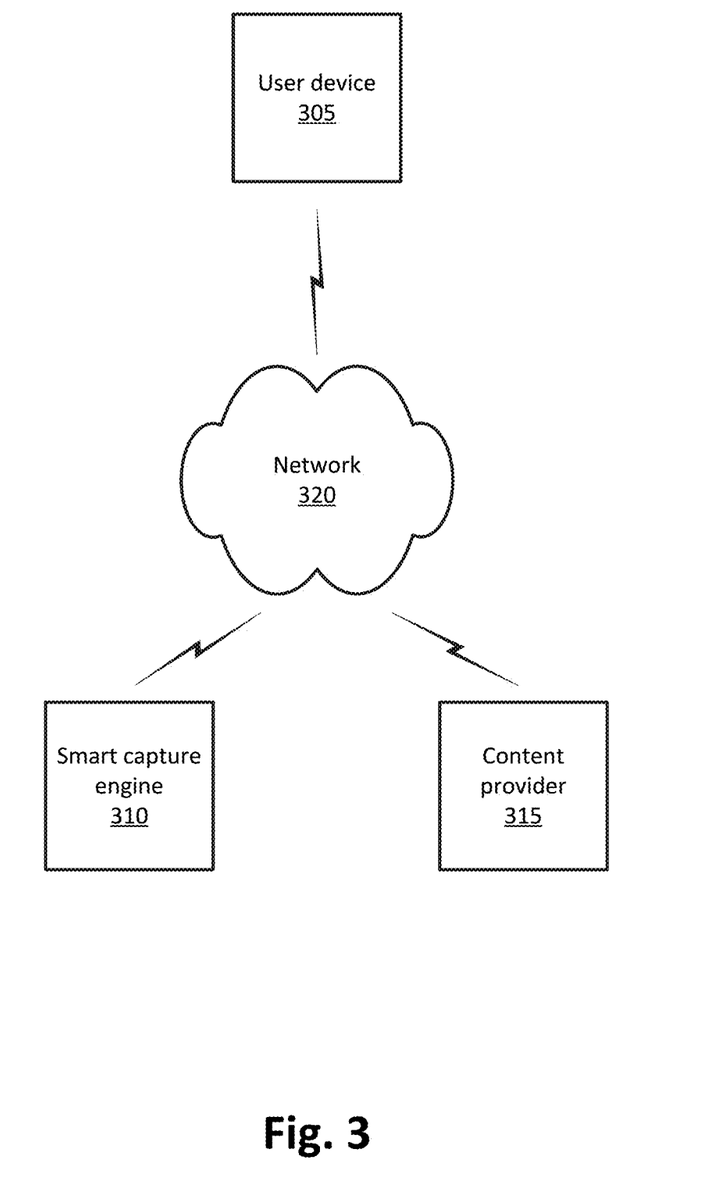
FIG. 3 illustrates an example environment, in which systems and/or methods, described herein, may be implemented.

FIG. 3 illustrates an example environment 300, in which systems and/or methods described herein may be implemented. As shown in FIG. 3, environment 300 may include user device 305, smart capture engine 310, content provider 315, and network 320.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300. Also, while "direct" connections are shown in FIG. 3 between certain devices, some devices may communicate with each other via PDN 330 (and/or another network).

User device 305 may include any computation and communication device that is capable of communicating with one or more networks (e.g., network 320). For example, user device 305 may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a set-top device ("STD"), a personal gaming system, a wearable device, and/or another type of computation and communication device. User device 305 may include logic and/or hardware circuitry to communicate via one or more "short range" wireless protocols, such as WiFi (e.g., based on an Institute of Electrical and Electronics Engineers Institute of Electrical and Electronics Engineers ("IEEE") 802.11-based standard), Bluetooth, Near Field Communications ("NFC"), ZigBee (e.g., based on an IEEE 803.15.4-based standard), or the like. User device 305 may also include logic and/or hardware circuitry to communicate via a wireless telecommunications protocol (e.g., via cellular network 310), such as Long-Term Evolution ("LTE"), Third Generation Partnership Project ("3GPP") Third Generation ("3G"), Code Division Multiple Access ("CDMA") 2000 1x, and/or another wireless telecommunications protocol.

Smart capture engine 310 may include one or more server devices (e.g., a single physical device or a distributed set of devices) that perform one or more functions related to detecting and/or providing information regarding suggested clips of content items, as described herein. The functionality of smart capture engine 310 is described in greater detail below.

Content provider 315 may include one or more server devices (e.g., a single physical device or a distributed set of devices) that provide content (e.g., streaming content) to user device 305. For example, as described below, content provider 315 may provide streaming content and/or files, associated with content, for "offline" viewing. In some implementations, content provider 315 may be, or may be communicatively coupled to, a content delivery network ("CDN"), which may cache content at "edges" of networks, in order to reduce the load within a network (e.g., within an Internet service provider's network).

Network 320 may include one or more radio access networks ("RANs"), via which user device 305 may access one or more other networks or devices, a core network of a wireless telecommunications network, an Internet Protocol ("IP")-based PDN, a wide area network ("WAN") such as the Internet, a private enterprise network, and/or one or more other networks. User device 305 may connect, via network 320, to data servers, application servers, other user devices 305, etc. Network 320 may be connected to one or more other networks, such as a public switched telephone network ("PSTN"), a public land mobile network ("PLMN"), and/or another network.

Figure 4:
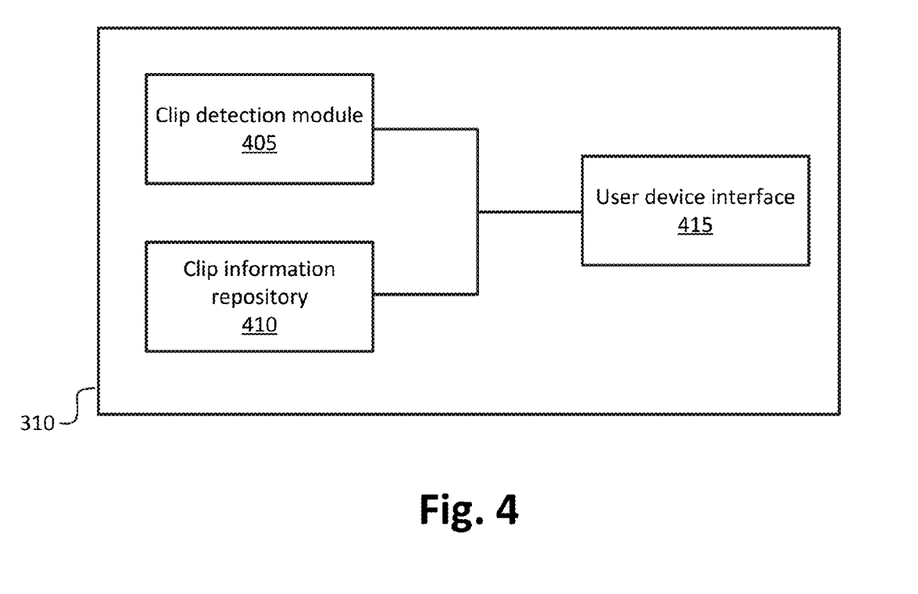
FIG. 4 illustrates example functional components of a smart clip capture engine.

FIG. 4 illustrates example functional components of smart capture engine 310. As shown, smart capture engine 310 may include clip detection module 405, clip information repository 410, and user device interface 415. Some or all of components 405-415 may be implemented as hardware circuitry, software logic, and/or some combination thereof. In some implementations, smart capture engine 310 may include additional components, fewer components, and/or differently arranged components than shown in FIG. 4.

Clip detection module 405 may receive information regarding clips received from one or more user devices 305 (e.g., via user device interface 415). For example, as will be described later, user device 305 may output, to smart capture engine 310, information regarding a clip, captured at user device 305, such as a start time and/or an end time of the clip, an identification of the content from which the clip was captured, etc. Smart capture engine 310 may provide the information to smart capture engine 310, which may store information regarding clips.

In some implementations, clip detection module 405 may compare received information, regarding received clips, in order to detect popular clips. For example, a "popular" clip may be a clip that was captured relatively frequently, and/or by a large quantity of users. An example of a popular clip may be a memorable quote or scene in a movie, which users have captured as a clip. As described below, information regarding popular clips may be used to assist users in capturing such clips with a single input (e.g., a single button press).

Figure 5:
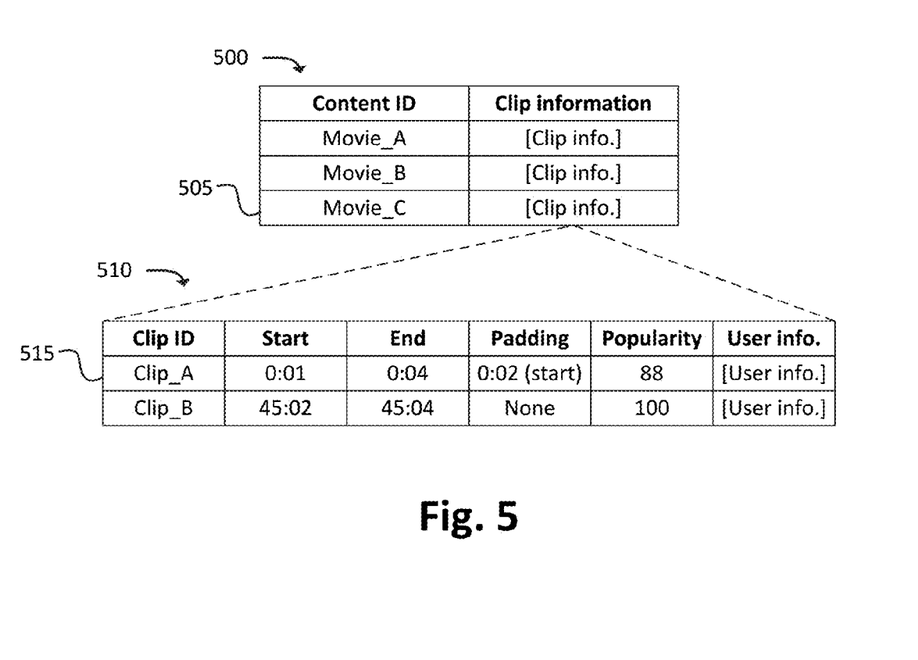
FIG. 5 illustrates an example data structure, which may be stored by a smart clip capture engine.

FIG. 5 illustrates an example structure 500, which may be stored by clip information repository 410, and which may be used by clip detection module 405 in detecting popular clips. Data structure 500 is represented as a table having rows and columns. However, in practice, data structure 500 may take the form of any other type of data structure (e.g., a linked list, a tree, a hash table, and/or another type of data structure). As shown, data structure 500 may include "Content identifier ('ID')" column, and "Clip information" column. Each row in data structure 500 may represent information regarding one or more clips associated with a particular item of content. An "item" of content may refer to a particular discrete and/or identifiable item, and may be identified by a file name, a set of file names, a name of a movie (or other type of content), a unique identifier of a movie (or other type of content), or the like. The clip information, for a particular content item, may include another data structure.

For instance, as shown, row 515 may represent the clip information in row 505 of data structure 500, which may be the clip information for a content item having the content identifier "Movie_C." As with data structure 500, data structure 510 is represented in FIG. 5 as a table, but in practice, may take the form of another type of data structure. As shown, row 515 may include the following example columns: "Clip ID," "Start," "End," "Padding," "Popularity," and "User information ('info.')." Each row in data structure 500 may represent a particular clip, as well as information associated with the clip.

For example, row 515 may represent a particular clip, having the clip identifier "Clip_A." Clip_A may have a start time of 0:01 (i.e., Clip_A may start 1 second after Movie_A starts) and an end time of 0:04 (i.e., Clip_A may end 4 seconds after Movie_A starts). The "Padding" field may be used indicate deviations between when a user initiated or ended a clip capture, and the final start and/or end time of the clip. For example, a user may initiate a clip capture at 0:02 (as denoted by "0:02 (start)" in the figure, but may later edit the clip to begin at 0:01. In some instances, the user may have edited the clip by manually modifying the start and/or end time of the clip, or the user may have indicated his or her agreement in using a suggested clip. For instance, assume that the user pressed a "start capture" button at 0:02. In accordance with some implementations described herein, popular Clip_A, which starts at 0:01, may have been provided to the user, and the user may have accepted the clip without further modifying the clip. In another example (not shown), the "Padding" field may additionally, or alternatively, indicate: an amount of time before the start time of a clip that a user initially (i.e., "initially" in the sense of, before finalizing the clip) started capture, an amount of time before the end of a clip that a user initially ended capture, and/or an amount of time after the end of a clip that a user initially ended capture.

The padding information, shown in FIG. 5, may represent information regarding a single user's interactions regarding capturing a clip. In other implementations, the padding information may reflect multiple users' interactions regarding capturing a clip. For example, the information shown in FIG. 5 ("0:02 (start)") may be an average, or other calculated value, derived from multiple users' interactions (e.g., a relatively large quantity of users may have selected to start the clip capture at 0:02 and then subsequently edited the clip or approved a suggested clip that started at 0:01).

The padding information may be useful (e.g., to clip detection module 405) in detecting whether a clip should be automatically generated based on a user's single input. For example, if a user who is currently viewing Movie_A selects a "start capture" button at 0:02, clip detection module 405 may determine that Clip_A should be suggested to the user. In some implementations, the padding information may not be dispositive, but may be a factor in determining whether a particular clip should be suggested to the user.

In another example situation, assume that padding information for a particular clip indicates that users often selected to start the capture 1 second after the end of the clip (e.g., users may have selected the "start capture" button, and then adjusted the start and/or end times to capture the clip that was played before the user selected the button). The padding information may be particularly useful in this situation, as clip detection module 405 may be able to "retroactively" detect clips—that is, clips that have already occurred in the past, as compared to when a user selects a "start capture" button.

The "Popularity" field may indicate a measure of popularity of a particular clip. The measure of popularity may be determined based on one or more factors, such as a quantity of times that a particular clip was selected. Another example of a factor, based on which the measure of popularity may be based, is a quantity of times that the particular clip was selected as compared to a quantity of views of a particular content item (e.g., Movie_A). The latter factor may assist in detecting clips that are relatively popular, but for which an absolute quantity of captures is relatively low (e.g., a popular clip in an unpopular movie). On the other hand, this factor may assist in detecting clips that are relatively unpopular, but for which an absolute quantity of captures is relatively high (e.g., an unpopular clip in a popular movie).

The measure of popularity may be expressed in terms of a score, such as a value from 1-100. In some implementations, the measure of popularity may be expressed in other ways, such as a raw number (e.g., a raw quantity of times that a slip was selected).

The popularity of a clip may be useful (e.g., to clip detection module 405) in detecting whether a clip should be automatically generated based on a user's single input. For example, if a user selects a "start capture" button during the presentation of a particular item of content (e.g., Movie_A), a time point in the item of content when the button is selected is within the start and/or end time of a predetermined clip (e.g., Clip_A), and the measure of popularity is greater than a threshold (e.g., greater than 80), then the predetermined clip may be suggested to the user, based on the single button selection.

The "User information" field may include information regarding users who have captured clips, and/or to whom clips have been suggested. The user information may include, for instance, demographics information, such as an age, gender, and/or other demographics information regarding one or more users. The user information may also include user behavior information, such as browsing history, geographic location history, or the like, which may be collected on an ongoing basis, may be provided explicitly by the user, etc. In situations where such information is collected and/or monitored, users may be given the opportunity to opt in or opt out at any time, and to permanently remove such information upon request.

The user behavior information, for a particular user, may be linked to the other information stored in data structure 510. For example, data structure 510 may store information indicating that one user, who is a young male, selected to start clip capture at 0:02, and ended up accepting suggested Clip_A, while another user, who is an elderly female, selected to start clip capture at 0:04, and manually edited the clip to have a start time of 0:01 and an end time of 0:04 (thus, yielding a clip identical to Clip_A).

In some implementations, the user information may also store information regarding users who did not select a particular clip. For example, clip detection module 405 may receive information indicating that a particular user viewed a content item but did not initiate a clip capture that corresponds to Clip_A.

The user information may be useful (e.g., to clip detection module 405) in detecting whether a clip should be automatically generated based on a user's single input. For instance, users who have similar characteristics or tendencies may tend to capture a particular clip, while other users may not tend to capture the particular clip. For example, assume that Clip_A is generally popular among young males (e.g., as indicated by the user information, which may indicate that a relatively large proportion of young males viewed Movie_A and selected to capture Clip_A, and/or that a relatively quantity of young males who selected to capture Clip_A is above a threshold quantity), while Clip_A is generally unpopular among elderly females (e.g., as indicated by the user information, which may indicate that a relatively large quantity of elderly females viewed Movie_A but did not select to capture Clip_A, and/or that a quantity of elderly females who selected to capture Clip_A is below a threshold quantity).

Referring back to FIG. 4, as mentioned above, clip detection module 405 may use some or all of the information, stored by data structure 500, in detecting whether a clip should be automatically generated based on a user's single input. In some implementations, clip detection module 405 may use a combination of multiple types of information (e.g., multiple types of information discussed above with respect to FIG. 5, and/or other types of information), in detecting popular clips. In some implementations, clip detection module 405 may output information, regarding detected popular clips (e.g., clips stored in data structure 500 and/or data structure 510), to one or more user devices 305 and/or to other devices.

For example, clip detection module 405 may receive (e.g., via user device interface 415, which may be an implementation of an application programming interface ("API") and/or another type of interface) information indicating that a particular user device 305 has received a particular content item (e.g., has begun streaming the content item via a streaming service and/or has downloaded one or more files, associated with the content item, for "offline" viewing). Clip detection module 405 may receive the indication from user device 305, content provider 315 (e.g., a content provider that provides the content to user device 305), and/or from another source. Clip detection module 405 may identify one or more popular clips associated with the particular content item. For example, assume that the content item is Movie_A (shown in FIG. 5); clip detection module 405 may identify the popular clips Clip_A and Clip_B, and output information (e.g., start times, end times, padding information, etc.) to user device 305.

In some implementations, clip detection module 405 may receive user information, when receiving an indication that a particular user device 305 has received a content item. For example, clip detection module 405 may receive demographics information of a user associated with user device 305, and may identify (or forgo identifying) one or more popular clips, based on the demographics information. For instance, as discussed above, assume that the user, associated with user device 305, is a young male; clip detection module 405 may provide information regarding a clip that was popular among young males while forgoing providing information regarding another clip that was not popular among young males.

Clip detection module 405 may receive feedback information regarding popular clips, provided to user devices 305. For example, assume clip detection module 405 provides information, regarding Clip_A, to user device 305. During the presentation of Movie_A, a user of user device 305 may select a "start capture" button at 0:02, and user device 305 may automatically suggest Clip_A, based on the user's single input. Assume that the user accepts the suggested clip (either explicitly, by selecting an "accept clip" button, or implicitly, by performing no further modification of the clip). User device 305 may output information, to smart capture engine 310 (e.g., to clip detection module 405, via user device interface 415), indicating that the user accepted the clip. Clip detection module 405 may modify the popularity score and/or the user information associated with the clip. For example, clip detection module 405 may increase the popularity score associated with the clip, and/or may store information indicating that the clip is popular with a particular type of user (e.g., based on the user's demographics and/or behavior information).

In another example situation, assume that the user did not accept the clip. For instance, the user may have deleted the clip, may have modified the clip (e.g., changed the start and/or end time of the clip), and/or may have otherwise indicated that he and/or she did not accept the clip. User device 305 may output information, to smart capture engine 310 (e.g., to clip detection module 405, via user device interface 415), indicating that the user did not accept the clip. Clip detection module 405 may modify the popularity score and/or the user information associated with the clip. For example, clip detection module 405 may decrease the popularity score associated with the clip, and/or may store information indicating that the clip is not popular with a particular type of user (e.g., based on the user's demographics and/or behavior information). In some implementations, clip detection module 405 may refine the start and/or end time of the clip (e.g., as stored in data structure 510) based on the user feedback (e.g., based on the start time and/or end time in the user's final, modified clip).

Figure 6:
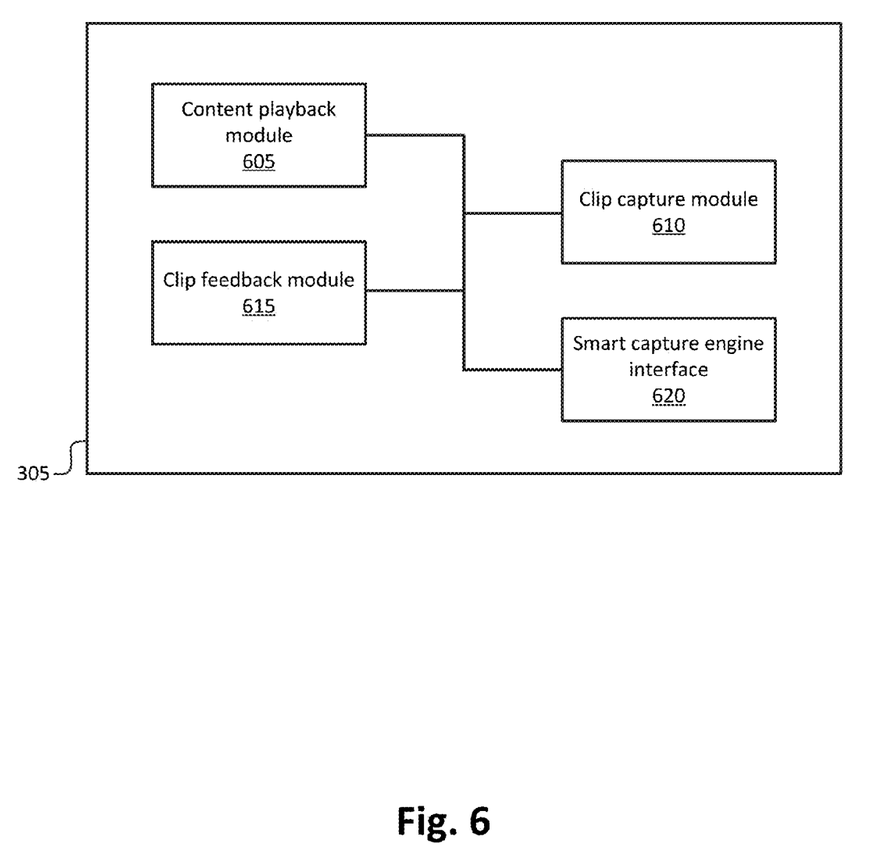
FIG. 6 illustrates example functional components of a user device.

FIG. 6 illustrates example functional components of user device 305, in accordance with some implementations. As shown, user device 305 may include content playback module 605, clip capture module 610, clip feedback module 615, and smart capture engine interface 620. Some or all of components 605-620 may be implemented as hardware circuitry, software logic, and/or some combination thereof. In some implementations, user device 305 may include additional components, fewer components, and/or differently arranged components than shown in FIG. 6.

Content playback module 605 may present content, such as content items received from content provider 315. Content playback module 605 may include a video player, an audio player, a web browser, etc. In some implementations, content playback module 605 may provide an indication to smart capture engine 310 (e.g., via smart capture engine interface 620), indicating that content playback module 605 has received and/or has begun presenting content. Content playback module 605 (and/or another device) may provide information regarding a user of user device 305, based on which smart capture engine 310 may identify one or more popular clips associated with the content item. Content playback module 605 may provide graphical options (e.g., one or more buttons, such as a "start capture" button, a "save clip" button, etc.) that allow the user to save a clip and/or initiate clip capture.

Clip capture module 610 may receive information regarding one or more clips (e.g., popular clips detected by clip detection module 405) associated with the content item. Clip capture module 610 may receive an indication that the user has made a selection to save a clip, and/or to initiate the capture of a clip, of the content item. For example, referring to the example in FIG. 1, clip capture module 610 may receive an indication that the user has selected the "save clip" button. Clip capture module 610 may determine whether one of the popular clips, received from smart capture engine 310, can be suggested to the user in response to the user's input (i.e., the selection of the "save clip" button). For example, clip capture module 610 may compare a current time position, in the presentation of the content, to the start time, the end time, and/or the padding associated with one or more of the popular clips.

Figure 7A:
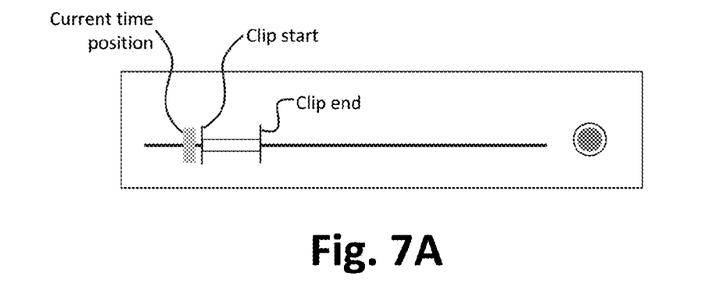
FIGS. 7A-7C illustrate example situations of the suggestion of popular clips, in response to a user's request to capture a clip.
Figure 7B:
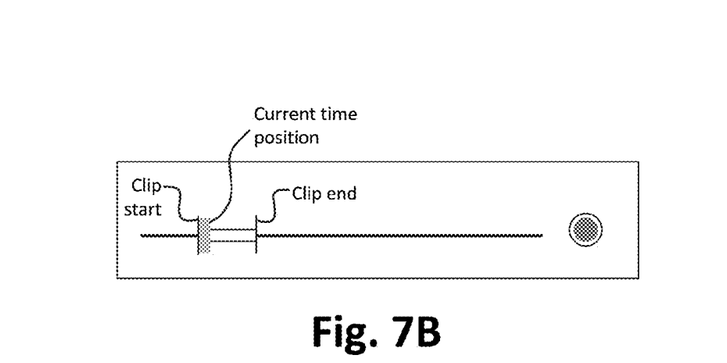
Figure 7C:
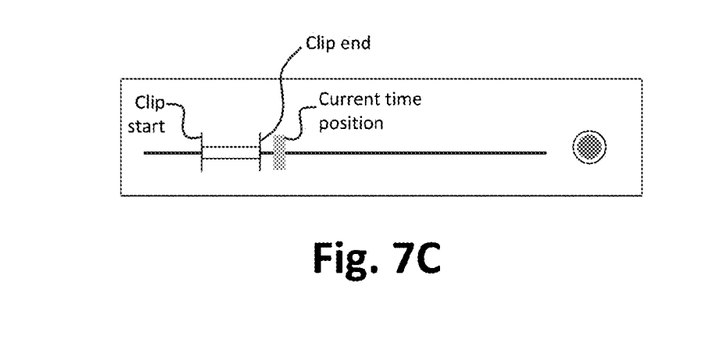

For instance, as shown in FIGS. 7A-7C, if the user has selected the "save clip" button before, during, or after a particular popular clip, the popular clip may be suggested (e.g., based on padding information associated with the clip). For example, FIG. 7A illustrates a situation where a popular clip is suggested, which starts after the user has selected the "save clip" button (i.e., after the current time position of the playing content). FIG. 7B illustrates a situation where a popular clip is suggested, starting at the exact time that the user has selected the "save clip" button. FIG. 7C illustrates a situation where a popular clip is suggested, which starts and ends before the user has selected the "save clip" button.

Clip capture module 610 may notify the user regarding the saved clip, such as by providing a visual and/or other type of indicator. For example, referring again to the example in FIG. 1 and/or in FIGS. 7A-7C, clip capture module 610 may display an indicator of the start time and the end time of the suggested clip.

Clip feedback module 615 may monitor the user's further interactions, regarding the clip, after the clip has been suggested. For example, clip feedback module 615 may determine whether the user has accepted the clip, based on whether a threshold amount of time has passed since the clip was suggested to the user, without the user modifying or deleting the clip. This may indicate that the user accepts the clip, since he or she has not modified or deleted the clip, and presumably approves of the suggestion. As another example, clip feedback module 615 may monitor whether the user selects an option to view the clip, after the clip has been suggested. Specifically, for instance, the user may view the clip to verify whether the suggested clip is in line with what the user had intended to capture. If the user views the clip and does not modify the clip after viewing, this may more strongly indicate that he or she approves of the clip. On the other hand, clip feedback module 615 may determine that the user has not accepted the clip, if the user modifies a start time and/or end time of the clip. As mentioned above, clip feedback module 615 may report the user's interactions (or lack thereof) to smart capture engine 310, which may further refine clips based on such interactions.

Figure 8:
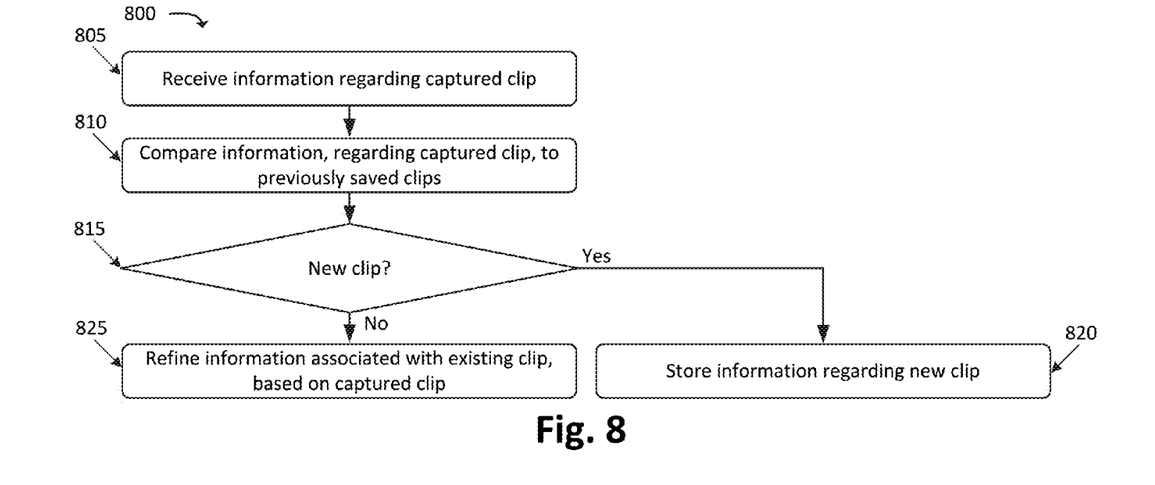
FIG. 8 illustrates an example process for generating and/or refining clips, to be used for subsequent clip captures.

FIG. 8 illustrates an example process 800 for generating and/or refining clips, to be used for subsequent clip captures. In some implementations, some or all of process 800 may be performed by smart capture engine 310 and/or one or more other devices.

As shown, process 800 may include receiving (at 805) information regarding a captured clip. For example, as discussed above with respect to clip detection module 405, smart capture engine 310 may receive information regarding a clip, captured at a particular user device 305. The clip may, in some situations, have been manually captured (e.g., a user may have specified a start and/or end time). Additionally, or alternatively, the information may indicate an acceptance and/or a modification of a suggested popular clip, as discussed above.

Process 800 may further include comparing (at 810) the information, regarding the captured clip, to previously saved clips. For example, as discussed above with respect to clip detection module 405 and clip information repository 410, smart capture engine 310 may compare the start time and/or end time of the clip to start times and/or end times of one or more previously saved clips associated with the same content item, in order to determine whether the captured clip matches a particular previously saved clip. In some implementations, the captured clip may "match" a previously saved clip when the start and end times are exactly the same. In some implementations, the captured clip may "match" a previously saved clip when the start and end times are approximately the same (e.g., within a particular threshold difference of start and/or end times, such as a start time, of the captured clip, within 2 seconds of a start time of a previously saved clip).

Process 800 may additionally include determining (at 815) if the captured clip is a new clip. This determination may be done based on the comparison (performed at 810). For example, if the captured clip matches a previously saved clip, then the captured clip may not be a new clip, while the captured clip may be a new clip if the captured clip does not match a previously saved clip.

If the captured clip is a new clip (at 815—YES), then process 800 may include storing (at 820) information regarding the new clip. For example, clip detection module 405 generate a new entry (e.g., a row in data structure 510), with information regarding the new clip (e.g., start time, end time, padding information if received, user information associated with a user of user device 305, etc.).

If, on the other hand, the captured clip is not a new clip (at 815—NO), then process 800 may include refining (at 825) the information associated with an existing clip, based on the captured clip. For example, clip detection module 405 may modify an entry associated with the existing clip (e.g., in data structure 510), such as by modifying the start and/or end time of the existing clip (if slightly different from the captured clip), modifying the measure of popularity of the existing clip, and/or saving user information associated with the user of user device 305.

Figure 9:
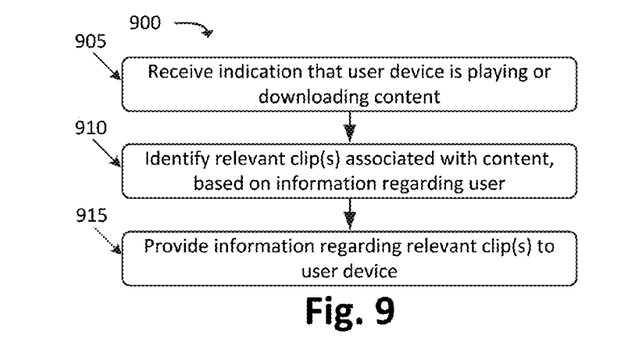
FIG. 9 illustrates an example process for providing information regarding clips, associated with a particular item of content, to a user device.

FIG. 9 illustrates an example process 900 for providing information regarding clips, associated with a particular item of content, to a user device 305. In some implementations, some or all of process 900 may be performed by smart capture engine 310 and/or one or more other devices.

As shown, process 900 may include receiving (at 905) an indication that a user device is playing and/or downloading a content item. For example, as discussed above with respect to clip detection module 405, smart capture engine 310 may receive a notification (e.g., from user device 305 and/or from content provider 315) that user device 305 has received a content item (e.g., as streaming content and/or as one or more downloaded files for offline viewing). In some implementations, smart capture engine 310 may receive additional information, such as user information associated with a user of user device 305. As mentioned above, the user information may include demographics information, behavior information, and/or other types of information.

Process 900 may further include identifying (at 910) one or more relevant clips associated with the content item. In some implementations, the identification may be based on information regarding the user. For example, as discussed above with respect to clip detection module 405, smart capture engine 310 may identify clips that are associated with the content item. In some implementations, clip detection module 405 may filter out clips that may not be particularly relevant to the user (e.g., may be a poor match for the user, based on the user's demographics and/or behavior information). Process 900 may additionally include providing (at 915) information regarding the relevant clip(s) to user device 305.

Figure 10:
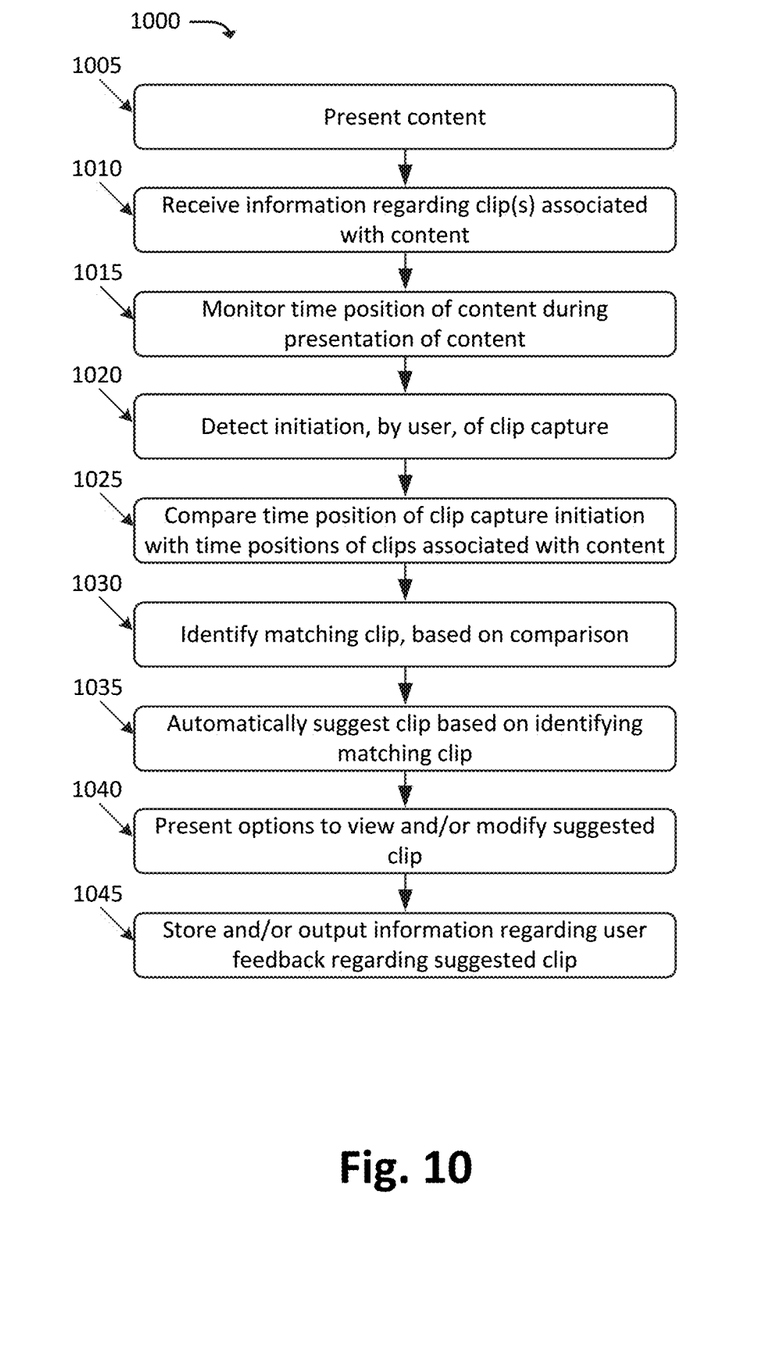
FIG. 10 illustrates an example process for automatically capturing a clip, during the presentation of content, based on a single input from a user.

FIG. 10 illustrates an example process 1000 for automatically capturing and outputting a clip, during the presentation of content, based on a single input from a user. In some implementations, some or all of process 1000 may be performed by user device 305 and/or one or more other devices.

As shown, process 1000 may include presenting (at 1005) a content item. For example, as discussed above with respect to content playback module 605, user device 305 may present a content item, such as video content received from content provider 315.

Process 1000 may further include receiving (at 1010) information regarding one or more clips associated with the content item. For example, as discussed above with respect to clip capture module 610, user device 305 may receive information regarding one or more previously saved clips from smart capture engine 310. In some implementations, the previously saved clips may have been identified, by smart capture engine 310, based on demographics of the user, behavior information associated with the user, etc.

Process 1000 may additionally include monitoring (at 1015) a time position of the content item during presentation of the content item (e.g., as discussed above with respect to clip capture module 610). Process 1000 may also include detecting (at 1020) initiation, by the user, of clip capture. For example, as discussed above with respect to clip capture module 610, smart capture engine 310 may detect that the user has selected an option to capture a clip, or to initiate the capture of a clip.

Process 1000 may further include comparing (at 1025) the time position of the clip capture initiation with time positions of clips associated with the content item, and identifying (at 1030) a matching clip, based on the comparison (e.g., as also described above with respect to clip capture module 610). For example, user device 305 may use start times, end times, and/or padding information, associated with one or more clips (the information for which was received at 1010), with the time position of the clip when the user selected the option to capture the clip.

Process 1000 may also include automatically suggesting (at 1035) a clip, based on identifying the matching clip. For example, user device 305 may output an indication that the clip was saved, and may indicate the start and end times of the suggested clip.

Process 1000 may further include presenting (at 1040) options to view and/or modify the suggested clip. For example, user device 305 may present a button (and/or other graphical option) that the user may select to view the suggested clip, modify the start and/or times of the suggested clip, accept the suggested clip, and/or delete the suggested clip.

Process 1000 may also include storing and/or outputting (at 1045) information regarding user feedback regarding the suggested clip. For example, as described above with respect to clip feedback module 615, user device 305 may determine whether the user modified the clip, deleted the clip, accepted the clip, and/or performed some other action on the clip, and may output such information to smart capture engine 310. As discussed above, smart capture engine 310 may use the information to refine the saved clips, to improve the experience for future users. In this manner, the saved clips may be continuously improved in an ongoing, iterative process.

Figure 11:
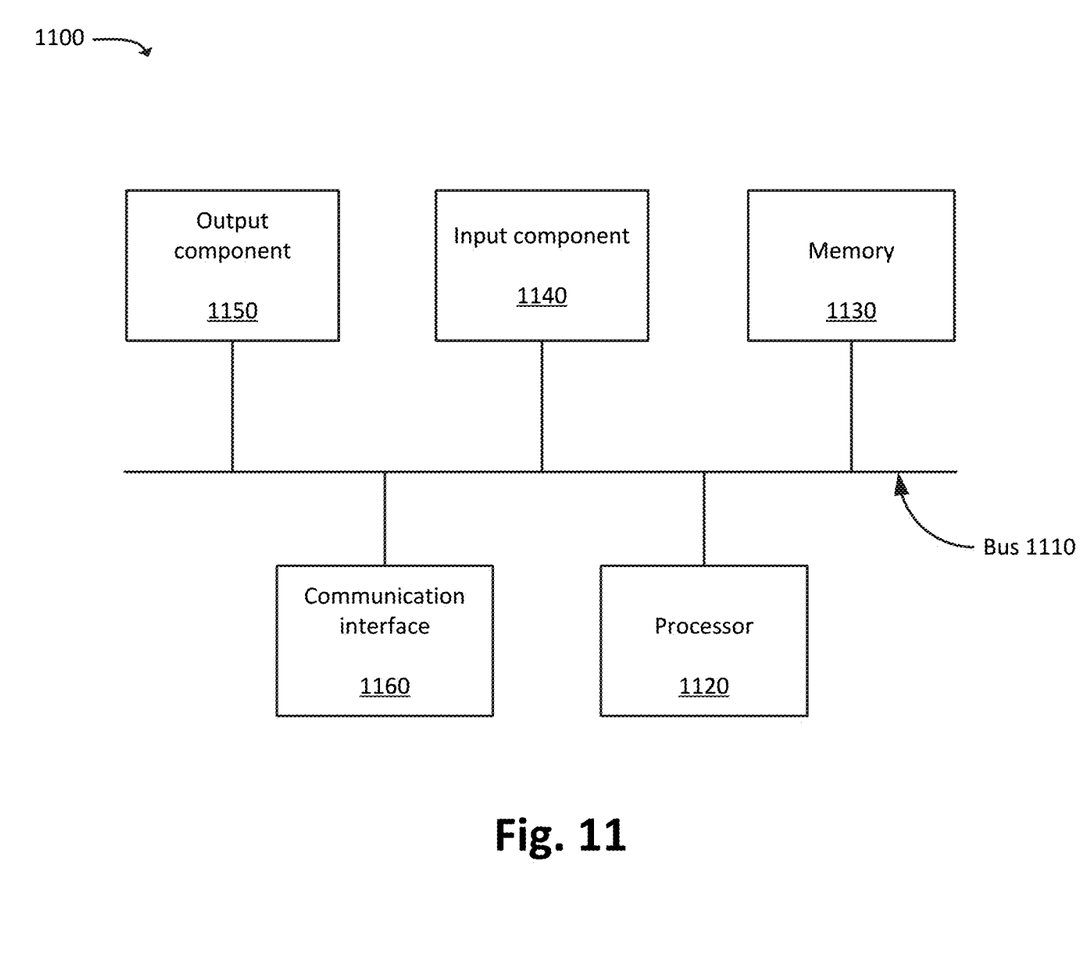
FIG. 11 illustrates example components of a device, in accordance with some implementations described herein.

FIG. 11 is a diagram of example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, in some implementations, various techniques, some examples of which have been described above, may be used in combination, even though such combinations are not explicitly discussed above. Furthermore, some of the techniques, in accordance with some implementations, may be used in combination with conventional techniques.

Additionally, while series of blocks have been described with regard to FIGS. 8-10, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user device, comprising:
    a display device;
    a non-transitory memory device storing a set of processor-executable instructions; and
    one or more processors configured to execute the set of processor-executable instructions, wherein executing the processor-executable instructions causes the one or more processors to:
        present, via the display device, a content item;
        receive information regarding one or more predefined clips associated with the content item, wherein the information, regarding the one or more predefined clips, includes:
            a start time of each clip, of the one or more predefined clips, within the content item, and
            an end time of each clip, of the one or more predefined clips, within the content item;
        after receiving the information regarding the one or more predefined clips, receive a request, from a user of the user device, to capture a portion of the content item as a clip, the request including only one input from the user;
        determine a time position of the content item that corresponds to when the request was received from the user;
        identify, based on the determined time position, a particular predefined clip, of the one or more predefined clips, that corresponds to the request, the identifying including identifying the start time associated with the particular predefined clip and the end time associated with the particular predefined clip; and
        present, via the display device, the identified particular predefined clip in response to the request.

2. The user device of claim 1, wherein the start time and end time, of each clip, is expressed in relation to a time position of the content item.

3. The user device of claim 1, wherein executing the processor-executable instructions, to identify the particular predefined clip that corresponds to the request, further causes the one or more processors to:
    determine whether the time position, that corresponds to when the request was received from the user, falls between a start time of the particular predefined clip and an end time of the particular predefined clip.

4. The user device of claim 1, wherein executing the processor-executable instructions further causes the one or more processors to:
    provide identifying information, regarding the content item to a server device,
    wherein the information regarding the one or more predefined clips is received from the server device in response to the identifying information provided by the user device.

5. The user device of claim 1, wherein executing the processor-executable instructions further causes the one or more processors to:
    monitor a user interaction, with regard to the identified particular predefined clip; and
    output information regarding the user interaction to a device that detects or generates the predefined clips.

6. The user device of claim 5, wherein the user interaction includes a modification of the start time or the end time of the provided predefined clip,
    wherein the device, that detects or generates the predefined clips, modifies the predefined clip based on the modified start time or the end time.

7. A method, comprising:
    presenting, by a user device and via a display device associated with the user device, a content item;
    receiving, by the user device, information regarding one or more predefined clips associated with the content item, wherein the information, regarding the one or more predefined clips, includes:
        a start time of each clip, of the one or more predefined clips, within the content item, and
        an end time of each clip, of the one or more predefined clips, within the content item;
    after receiving the information regarding the one or more predefined clips, receiving, by the user device, a request, from a user of the user device, to capture a portion of the content item as a clip, the request including only one input from the user;
    determining, by the user device, a time position of the content item that corresponds to when the request was received from the user;
    identifying, by the user device and based on the determined time position, a particular predefined clip, of the one or more predefined clips, that corresponds to the request, the identifying including identifying the start time associated with the particular predefined clip and the end time associated with the particular predefined clip; and
    presenting, by the user device and via the display device, the identified particular predefined clip in response to the request.

8. The method of claim 7, wherein the start time and end time, of each clip, is expressed in relation to a time position of the content item.

9. The method of claim 7, wherein identifying the particular predefined clip that corresponds to the request comprises:
determine whether the time position, that corresponds to when the request was received from the user, falls between a start time of the particular predefined clip and an end time of the particular predefined clip.

10. The method of claim 7, wherein the content item includes video content.

11. The method of claim 7, further comprising:
providing identifying information, regarding the content item to a server device,
wherein the information regarding the one or more predefined clips is received from the server device in response to the identifying information provided by the user device.

12. The method of claim 7, further comprising:
monitoring a user interaction, with regard to the identified particular predefined clip; and
outputting information regarding the user interaction to a device that detects or generates the predefined clips.

13. The method of claim 12, wherein the user interaction includes a modification of the start time or the end time of the provided predefined clip,
wherein the device, that detects or generates the predefined clips, modifies the predefined clip based on the modified start time or the end time.

14. A server device, configured to:
receive information regarding a plurality of clips, captured by a plurality of user devices, the clips corresponding to one or more portions of a particular content item;
detect, based on the information regarding the plurality of clips, a particular popular clip, the detecting including detecting a start time and an end time of the particular popular clip;
receive an indication that a particular user device has received the particular content item; and
output, to the particular user device, information regarding the start time and the end time of the particular popular clip,
wherein the particular user device receives a request to capture a clip during playback of the particular content item, the request including only a single input from a user of the user device,
wherein the particular user device determines, based on a time position of the content item that corresponds to when the request was received from the user and further based on the start time or the end time of the particular popular clip, that the request is associated with the particular popular clip, and
wherein the particular user device visually presents the particular popular clip in response to the request, based on determining that the request is associated with the particular popular clip.

15. The server device of claim 14, wherein when detecting the particular popular clip, the server device is configured to:
analyze start times and end times of the plurality of clips,
wherein the start time and the end time of the particular popular clip is determined based on the analyzed start times and end times of one or more of the plurality of clips.

16. The server device of claim 14, wherein the server device is further configured to:
receive, after outputting the information regarding the start time and the end time of the particular popular clip, information indicating user interactions, at the particular user device; and
modify the start time or the end time of the particular popular clip, based on the user interactions.

17. The server device of claim 14, wherein the server device is further configured to:
receive information regarding a user of the particular user device; and
determine that the particular popular clip is relevant to the user, based on the information regarding the user,
wherein the outputting is based on the determination that the particular popular clip is relevant to the user.

18. The user device of claim 1, wherein at least one of the start time or the end time associated with the predefined clip is determined based on clips previously saved by other users.

19. The user device of claim 1, wherein at least one of the start time or the end time associated with the particular predefined clip is different from the time position of the content item that corresponds to when the request was received from the user.

20. The method of claim 7, wherein at least one of the start time or the end time associated with the predefined clip is determined based on clips previously saved by other users, and
wherein at least one of the start time or the end time associated with the particular predefined clip is different from the time position of the content item that corresponds to when the request was received from the user.

* * * * *